United States Patent
Chen et al.

(10) Patent No.: US 8,429,332 B2
(45) Date of Patent: Apr. 23, 2013

(54) MULTI-CHANNEL HYBRID DENSITY MEMORY STORAGE DEVICE AND CONTROL METHOD THEREOF

(75) Inventors: Ming-Dar Chen, Hsinchu (TW); Chuan-Sheng Lin, Jhubei (TW); Tso-Cheng Su, Taipei (TW); Shih-Fang Hung, Yonghe (TW); Tzu-Wei Fang, Jhonghe (TW); Hsiang-An Hsieh, Sijhih (TW)

(73) Assignee: A-Data Technology Co., Ltd., Taipei (TW)

( * ) Notice: Subject to any disclaimer, the term of this patent is extended or adjusted under 35 U.S.C. 154(b) by 444 days.

(21) Appl. No.: 12/382,442

(22) Filed: Mar. 17, 2009

(65) Prior Publication Data

US 2009/0307418 A1 Dec. 10, 2009

(30) Foreign Application Priority Data

Jun. 4, 2008 (TW) ................................ 97120717 A

(51) Int. Cl.
*G06F 13/00* (2006.01)
*G06F 13/28* (2006.01)
*G06F 11/00* (2006.01)
*H03M 13/00* (2006.01)

(52) U.S. Cl.
USPC .... 711/103; 711/154; 711/170; 711/E12.083; 714/774; 714/42

(58) Field of Classification Search .................. 711/103, 711/E12.008, E12.075; 714/758, 774, 42
See application file for complete search history.

(56) References Cited

U.S. PATENT DOCUMENTS

| | | | |
|---|---|---|---|
| 6,807,106 B2 * | 10/2004 | Gonzales et al. | 365/185.33 |
| 7,206,224 B1 * | 4/2007 | Randolph et al. | 365/185.03 |
| 2006/0075395 A1 * | 4/2006 | Lee et al. | 717/168 |
| 2007/0061502 A1 * | 3/2007 | Lasser et al. | 711/103 |
| 2009/0113115 A1 * | 4/2009 | Nazarian et al. | 711/103 |
| 2009/0248952 A1 * | 10/2009 | Radke et al. | 711/100 |

* cited by examiner

*Primary Examiner* — Reginald Bragdon
*Assistant Examiner* — Eric S Cardwell
(74) *Attorney, Agent, or Firm* — Rosenberg, Klein & Lee

(57) ABSTRACT

The present invention discloses a control method of a multi-channel hybrid density memory storage device for access a user data. The storage device includes a plurality of low density memories (LDM) and high density memories (HDM). The steps of the method comprises: first, determining where the user data transmitted; then, using one of two error correction circuits which have different error correction capability to encode or decode the user data.

17 Claims, 8 Drawing Sheets

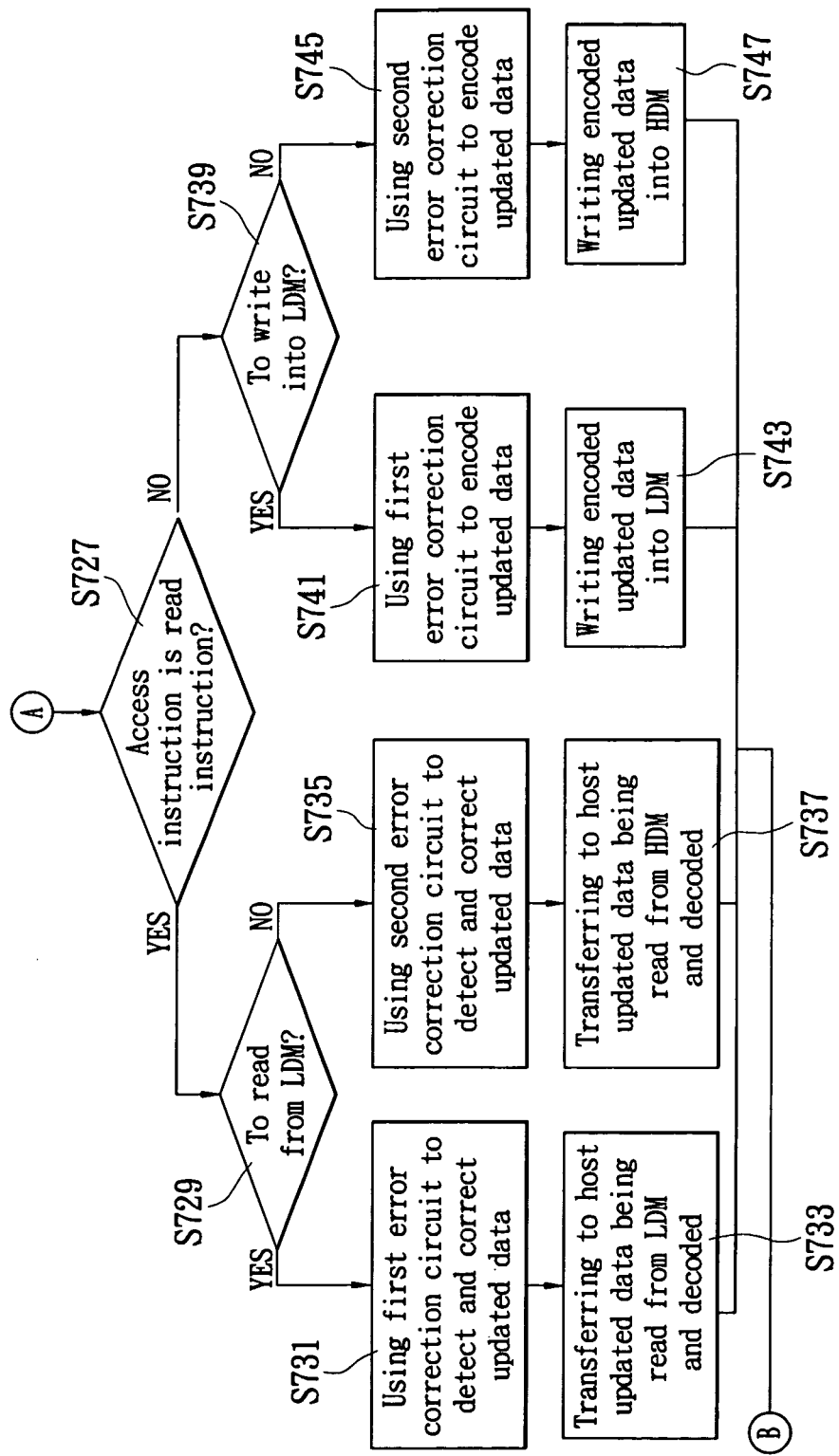

MULTI-CHANNEL HYBRID DENSITY MEMORY STORAGE DEVICE AND CONTROL METHOD THEREOF

BACKGROUND OF THE INVENTION

1. Field of the Invention

The present invention is related to a storage device; particularly, to a multi-channel hybrid density memory storage device and control method thereof.

2. Description of Related Art

It is very time-consuming to read/write date from/into storage device. For accelerating access speed of the storage device, prior arts mostly place a plurality of memories in the storage device, and connect these memories in parallel, simultaneously storing and accessing data in many memories, thereby increase data access speed.

Please refer to FIG. 1, a schematic diagram of a prior art multi-channel memory storage device is shown, wherein two groups of memories connected in parallel are taken as an example for illustrating the operations of data access in a dual-channel memory storage device. As shown in FIG. 1, a multi-channel memory storage device 13 is applied in a digital system 1, and the storage device 13 is coupled to a host 11 to accept instructions from the host 11, performing data read or write.

The multi-channel memory storage device 13 comprises a control unit 131 and six memories A~F. The control unit 131, coupled between the host 11 and the six memories A~F, for receiving one of the instructions from the host 11, so as to access the data in a logical block address to which the instruction corresponds into the memories A~F. The memories A~F is further divided into two groups, in which memories A, B, C are in the same group, while memories D, E, F are in the other group. The memories A, B, C and memories D, E, F are coupled to the control unit 131 respectively through data transmission lines 135, 139 and instruction transmission lines 133, 137 to transmit data and instructions. By using two instruction transmission lines 133, 137 to transfer different instructions, it is possible to allow the above-mentioned two groups of memories to perform differing access actions at the same time.

Next, please refer to FIG. 2, another schematic diagram of a prior art multi-channel memory storage device is shown, which is a variation from the one depicted in FIG. 1. As illustrated in FIG. 2, compared with FIG. 1, memories A, B, C and memories D, E, F are coupled to the control unit 131 respectively through data transmission lines 235, 237 and a common instruction transmission line 233 to transfer data and instructions. Herein by using one common instruction transmission line 233 to send instructions, it is possible to allow the above-mentioned two groups of memories to simultaneously reading or writing.

Usually, the memories employed in storage devices are either completely Multi-level-cell (MLC) or completely Single-level-cell (SLC), wherein the memories composed of MLC are referred as High Density Memory (HDM), and the memories composed of SLC are known as Low Density Memory (LDM). The LDM provides advantages of fast data access speed, high reliability, greater number of endurance; while HDM offer features of greater storage capacity and low cost. Hence, in view of the characteristics of both two types of memory, there is another type of memory having these two types of memory installed together in one single storage device, referred to as Hybrid Density Memory.

While the architecture of multi-channel memory storage device has become mature, however, the architecture and method for applying Hybrid Density Memory onto multi-channel concept have not yet been proposed so far, as a result, it is an issue desirable to be addressed about how to allocate HDM and LDM under the multi-channel system architecture, in order to exploit the advantages of both types of memory for efficient data access.

SUMMARY OF THE INVENTION

Regarding to the above-mentioned issues, the present invention proposes a better configuration for allocating High Density Memory (HDM) and Low Density Memory (LDM) under the multi-channel system architecture, and employs different error correction circuits based on features of both types of memory, so as to accelerate access speed of the storage device and to enhance the data process performance as well.

Therefore, one object of the present invention is to provide a multi-channel hybrid density memory storage device and control method thereof, to accelerate access speed of the storage device and also to increase the data transmission rate.

The present invention discloses a multi-channel hybrid density memory storage device which is suitable for data access. The said multi-channel hybrid density memory storage device comprises a non-volatile memory unit and a control unit. Herein the non-volatile memory unit consists of a plurality of memory groups, each memory group has at least one LDM and at least one HDM. The control unit is coupled to the non-volatile memory unit, used for simultaneously accessing the data in the multiple LDM's or the multiple HDM's.

In one embodiment of the present invention, the data is accessed between a host and the non-volatile memory unit, or accessed between the LDM's and the HDM's.

In one embodiment of the present invention, the control unit has a first error correction circuit and a second error correction circuit, wherein the error correction capability of the first error correction circuit is lower than the error correction capability of the second error correction circuit. Data inside the LDM is decoded and encoded by the first error correction circuit, while data inside the HDM is decoded and encoded by the second error correction circuit.

In one embodiment of the present invention, if the data is to be transferred from the HDM to the LDM's, the control unit will equally divide the data and then transfer it to the LDM's which are belonging into different memory groups; contrarily, if the data is to be transferred from the LDM's to the HDM, then the control unit will merge the data in the LDM's which are belonging into different memory groups and then transfer it to the HDM, thereby adjusting access approaches according to the number of pages occupied by the updated data in memories with different densities.

The present invention further discloses a control method of a multi-channel hybrid density memory storage device, which is suitable for data access. Such a storage device has a non-volatile memory unit, a first error correction circuit and a second error correction circuit, wherein the non-volatile memory unit consists of at least one LDM and at least one HDM, and the error correction capability of the first error correction circuit is lower than the error correction capability of the second error correction circuit. The steps of the said control method comprise: initially, determining the transmission direction of the data; next, performing an encoding/decoding procedure, which is based on the above-mentioned determination to use the first error correction circuit or the second error correction circuit to encode and decode the data;

finally, adjusting access approaches according to the number of pages occupied by the data in the HDM and the LDM.

In the said encoding/decoding procedure, if it is to read the data from the LDM, then the first error correction circuit will be used to decode the updated data; suppose it is to read the data from the HDM, then the second error correction circuit will be used to decode the data; also, in case it is to write the data into the LDM, then the first error correction circuit will be used to encode the data; whereas if it is to write the data into the HDM, then the second error correction circuit will be used to encode the data.

By means of the aforementioned technique, the present invention can perform data accesses in the LDM's connected in parallel or in the HDM's connected in parallel, and also employ error correction circuits with different error correction capability to encode/decode the data, accordingly further accelerating data access speed and increasing performance of data process in the storage device.

The Summary illustrated supra as well as the subsequent Detailed Descriptions and appended drawings are all for further explaining the approaches, means and effects taken by the present invention to achieve the prescribed objectives. Other purposes and advantages related to the present invention will be set out in the following descriptions and diagrams as well.

BRIEF DESCRIPTION OF THE DRAWINGS

FIG. 7-1~7-2 are flowcharts of the control method for a multi-channel hybrid density memory storage device disclosed by the present invention.

DETAILED DESCRIPTION OF THE PREFERRED EMBODIMENTS

In a multi-channel hybrid density memory storage device, if the configuration of the LDM and the HDM is arbitrarily allocated, then it is very likely to cause problem of poor data access performance. Taking the dual-channel hybrid density memory architecture for example, if all LDM's are allocated in one of the two channels, while all HDM's are allocated in the other channel, then it is not possible to simultaneously perform data access in the LDM or the HDM, thus impossible to achieve the objective of efficient data access under the multi-channel architecture.

In view of this, the multi-channel hybrid density memory storage device and control method thereof proposed by the present invention is, by means of an architecture of connecting in parallel a plurality of LDM's and connecting in parallel a plurality of HDM's, to simultaneously access the data within the LDM's or the HDM's In this way, compared with the use of single memory, it saves time, and further accelerates access speed and increases data process performance of the storage device.

The major technical characteristic of the present invention lies in the method of data access under the multi-channel system architecture by using the hybrid density memory storage device, and the required hardware architecture as well as action sequences thereof are presented hereunder; however, ones skilled in the relevant art can appreciate that, in addition to the elements and/or characteristics stated in the following texts, the multi-channel hybrid density memory storage device certainly involves other necessary components, which thus should not be construed as being restricted to these disclosed in the embodiments.

Figure 3:
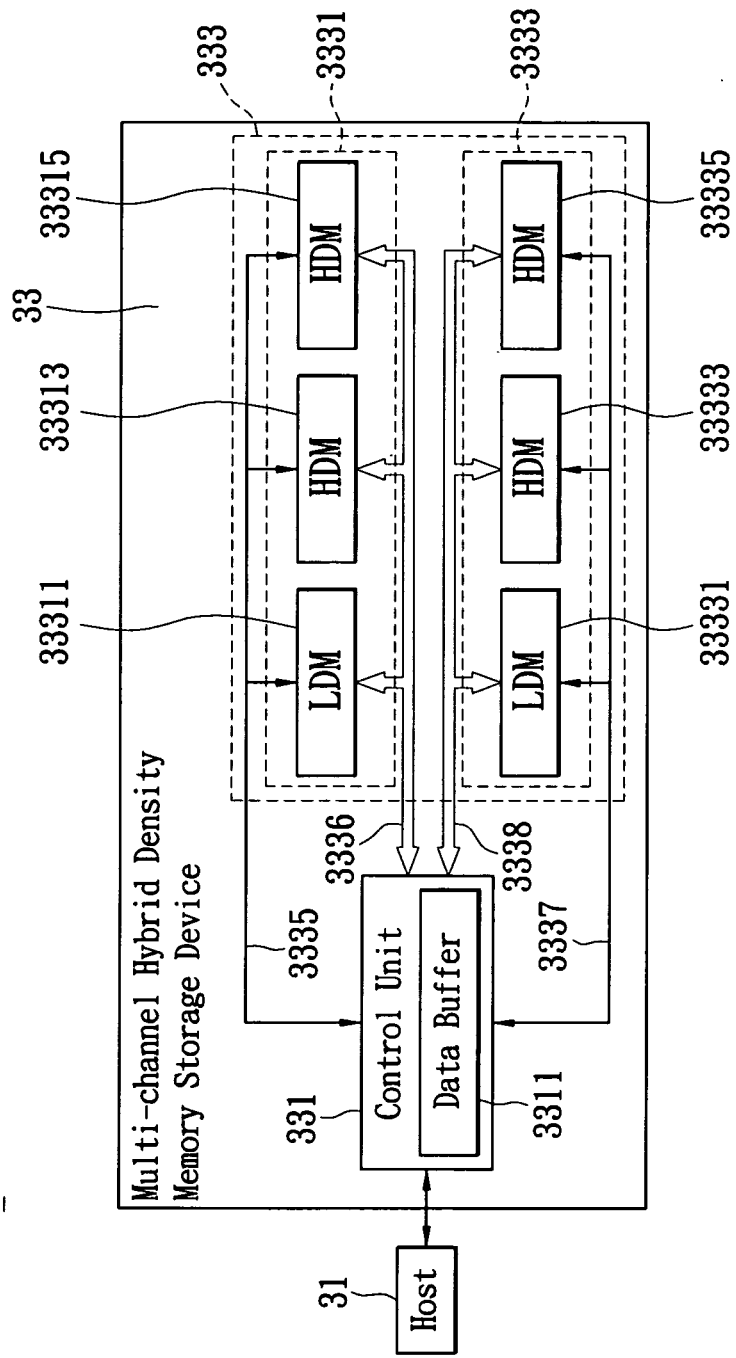
FIG. 3 is a schematic diagram of an embodiment of the multi-channel hybrid density memory storage device disclosed by the present invention.

Initially, please refer to FIG. 3, wherein a schematic diagram of an embodiment of the multi-channel hybrid density memory storage device disclosed by the present invention is shown. As illustrated in FIG. 3, a multi-channel hybrid density memory storage device 33 (hereunder simply referred as the storage device 33) is applied in a digital system 3, and the storage device 33 is coupled to a host 31 for accepting instructions from the host 31 to performing data read or data write. In practical implementations, the host 31 may be a computer system, and the storage device 33 may be a solid state hard drive of the computer system.

The storage device 33 comprises a non-volatile memory unit 333 and a control unit 331. The present embodiment takes the dual-channel system architecture as an example, and the non-volatile memory unit 333 consists of only two memory groups; i.e. a first memory group 3331 and a second memory group 3333. Herein the first memory group 3331 has a Low Density Memory (LDM) 33311 and two High Density Memory's (HDM's) 33313, 33315; and the second memory group 3333 also has a LDM 33331 and two HDM's 33333, 33335, connected in parallel with the first memory group 3331. The memory type of the said LDM can be of single-level cell (SLC) memory, phase change memory (PCM), free ferroelectric random access memory (FeRAM), or magnetic random access memory (MRAM); and the memory type of the HDM can be of multi-level cell (MLC) memory.

The first memory group 3331 and the second memory group 3333 are coupled to the control unit 331 to transfer data respectively through the data transmission lines 3336, 3338 and instruction transmission lines 3335, 3337. By using two instruction transmission lines 3335, 3337, it is possible to perform different access actions at the same time.

The control unit 331 is coupled between the host 31 and the non-volatile memory unit 333, for receiving read or write instructions from the host 31. The control unit 331 consists of a system interface (not shown) and a data buffer 3311. The system interface, coupled to the host 31, receives the instruction from the host 31 and transfers a user data corresponding to the instruction. The data buffer 3311, coupled to the non-volatile memory unit 333, registers (i.e. temporarily storing) the user data between the host 31 and the storage device 33, or alternatively, registers (i.e. temporarily storing) the user data between the LDM's and HDM's.

In one embodiment, when the host 31 intends to write the updated data into the non-volatile memory unit 333, the control unit 331 first registers the updated data in the data buffer 3311; then, by respectively using the instruction lines 3335, 3337, sends the write instruction to the first and second memory groups 3331, 3333; and also by respectively using the data transmission lines 3336, 3338, simultaneously transfers the data evenly divided by the control unit 331 to the LDM's 33311, 33331 or the HDM's 33313, 33333. Also, since the instruction transmission lines 3335, 3337 are different lines, it is possible thus to perform read action on the LDM 33311 in the first memory group 3331, and at the same time, to perform write action on the LDM 33331 in the second memory group 3333.

Figure 4:
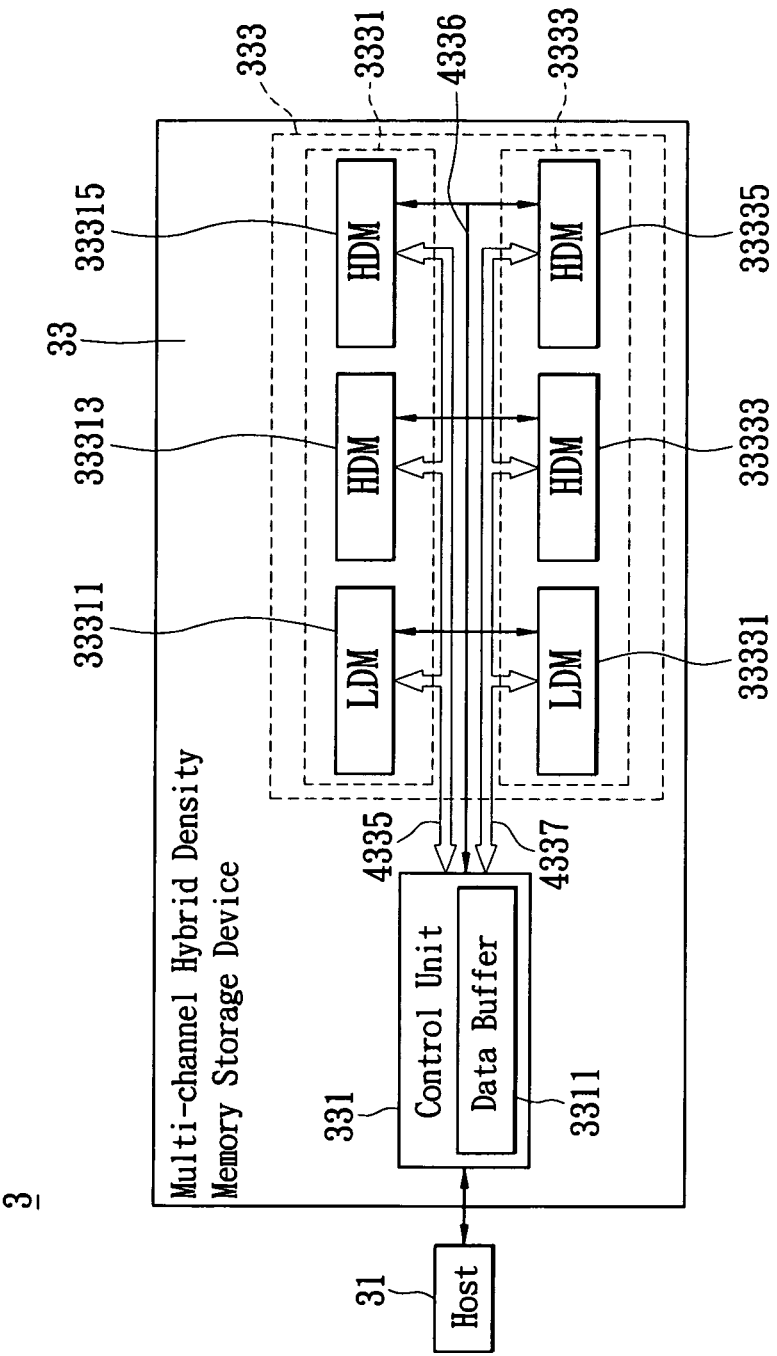
FIG. 4 is a schematic diagram of another embodiment of the multi-channel hybrid density memory storage device disclosed by the present invention.

In addition to independent performance of different read and write action on the first memory group 3331 and on the second memory group 3333, it is also possible to adopt a system architecture illustrated as FIG. 4, wherein a schematic diagram of another embodiment of the multi-channel hybrid density memory storage device disclosed by the present invention is shown. As depicted therein, compared with FIG. 3, the first memory group 3331 and the second memory group 3333 are coupled to the control unit 331 respectively through the data transmission lines 4335, 4337 as well as a common instruction transmission line 4336 for data transmission. The instructions transferred by the same instruction transmission line 4336 allows the two groups of memory 3331, 3333 to simultaneously perform read or write actions.

Due to lower reliability and higher possibility of error occurrence in the HDM, therefore the HDM generally uses an error correction code with higher error correction capability to encode or decode data; whereas the data storage in LDM provides higher reliability and lower possibility of error occurrence, as a result the LDM requires only an error correction code with lower error correction capability to encode or decode data. In view of this, the said control unit 331 of the present invention further includes a first error correction circuit and a second error correction circuit, wherein the error correction capability of the first error correction circuit is lower than the error correction capability of the second error correction circuit. In one embodiment, the first error correction circuit, in terms of data with 512 bits, has an error correction capability of 1 bit, and the second error correction circuit, similarly in terms of data with 512 bits, has an error correction capability of 3 bits. The data inside the LDM's 33311, 33331 is encoded and decoded by the first error correction circuit, and the data inside the HDM's 33313, 33333 is encoded and decoded by the second error correction circuit. By using the features of two memories with different densities, it is possible to provide error correction circuits of different levels in order to increase data process performance of the system.

The first error correction circuit and the second error correction circuit may be composed of two groups of independent circuits; or else formed by the same circuit which generates two types of correction codes, and the control unit 331 selectively initiates the correction code with lower error correction capability for the LDM, and the correction code with higher error correction capability for the HDM.

Based on consideration of evening erasure usage in the non-volatile memory unit 333, the data may be moved between the LDM and the HDM to operate a wear-leveling process, thus further extending the lifespan of the storage device 33. However, the units for data access defined by the LDM and the HDM could be different, thus while moving the data, it is required to consider whether the storage spaces after mutual conversion between the two types of memories with different densities are consistent.

Figure 5:
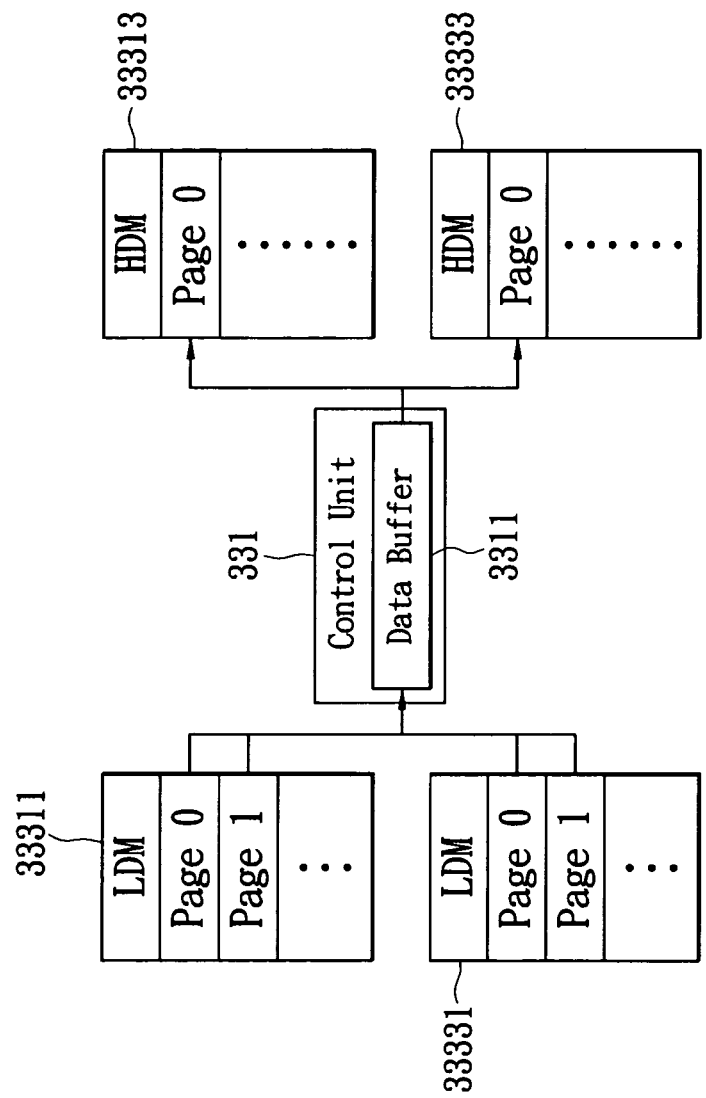
FIG. 5 is a schematic diagram of an embodiment for transferring the data from the Low Density Memory (LDM) to the High Density Memory (HDM) disclosed by the present invention.
Figure 6:
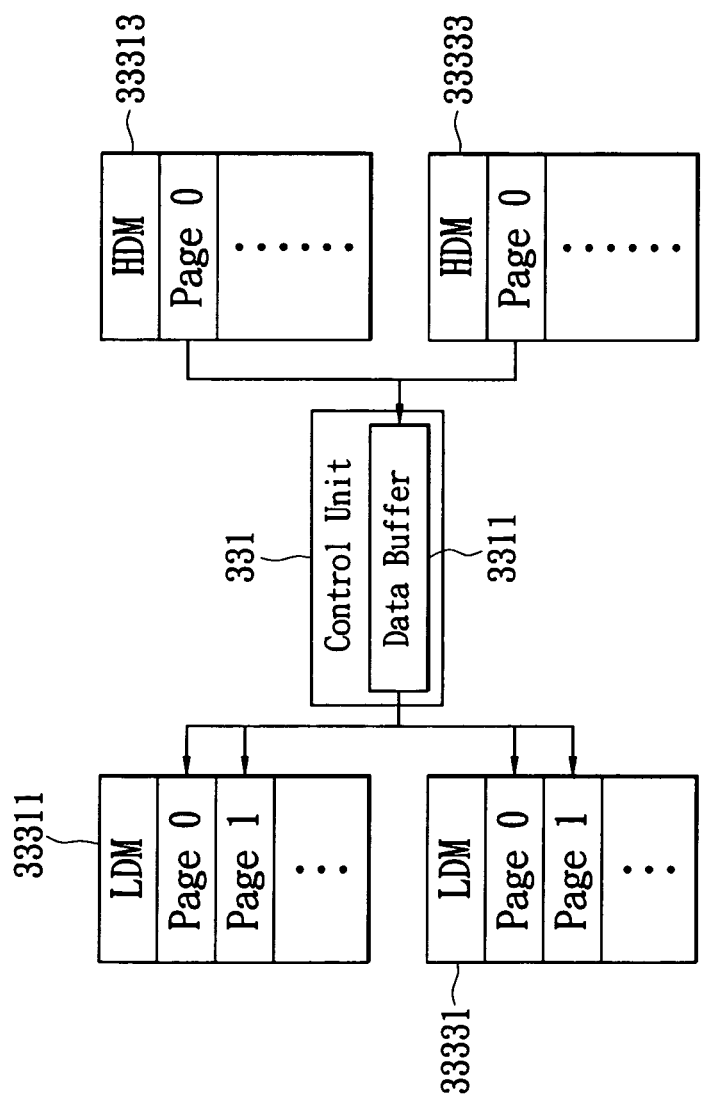
FIG. 6 is a schematic diagram of an embodiment for transferring the data from the HDM to the LDM disclosed by the present invention.

To further understand the approach for data access in the multi-channel hybrid density memories, please refer to FIG. 5, in which a schematic diagram of an embodiment for transferring the updated data from the Low Density Memory (LDM) to the High Density Memory (HDM) disclosed by the present invention is shown. The relevant schematic diagram thereof can be referred in conjunction with FIG. 3. As illustrated in FIG. 5, the LDM's 33311, 33331 and the HDM's 33313, 33333 respectively define a plurality of pages used to store the data, wherein the pages defined by the memories with two types of density may vary in size. Assuming the LDM 33311 defines the size of each page as 2 KB, while the HDM 33313 defines the size of each page as 4 KB, then when the data is moved from the LDM 33311, 33331 to the HDM 33313, 33333, the control unit 331 needs to consecutively read two pages of data contents from the LDM 33311, 33331, and moves them to one page in the HDM 33313, 33333. In one embodiment, the control unit 331, after merging the data in the page 0 of the LDM 33311 with the data in the page 0 of the LDM 33331, writes it into page 0 of the HDM 33313; simultaneously, the control unit 331, after merging the data in the page 1 of the LDM 33311 with the data in the page 1 of the LDM 33331, writes it into page 0 of the HDM 33333. Contrarily, in the situation that the data needs to be moved from the HDM to the LDM. Now refer to FIG. 6, a schematic diagram of an embodiment for transferring the data from the HDM to the LDM disclosed by the present invention is shown. The relevant schematic diagram thereof can be referred in conjunction with FIGS. 3 and 5. As illustrated in FIG. 6, the control unit 331, after reading the data from the page 0 of the HDM 33313, evenly divides it and then simultaneously writes it to the page 0 of the LDM 33311 and the page 0 of the LDM 33331.

Figure 1:
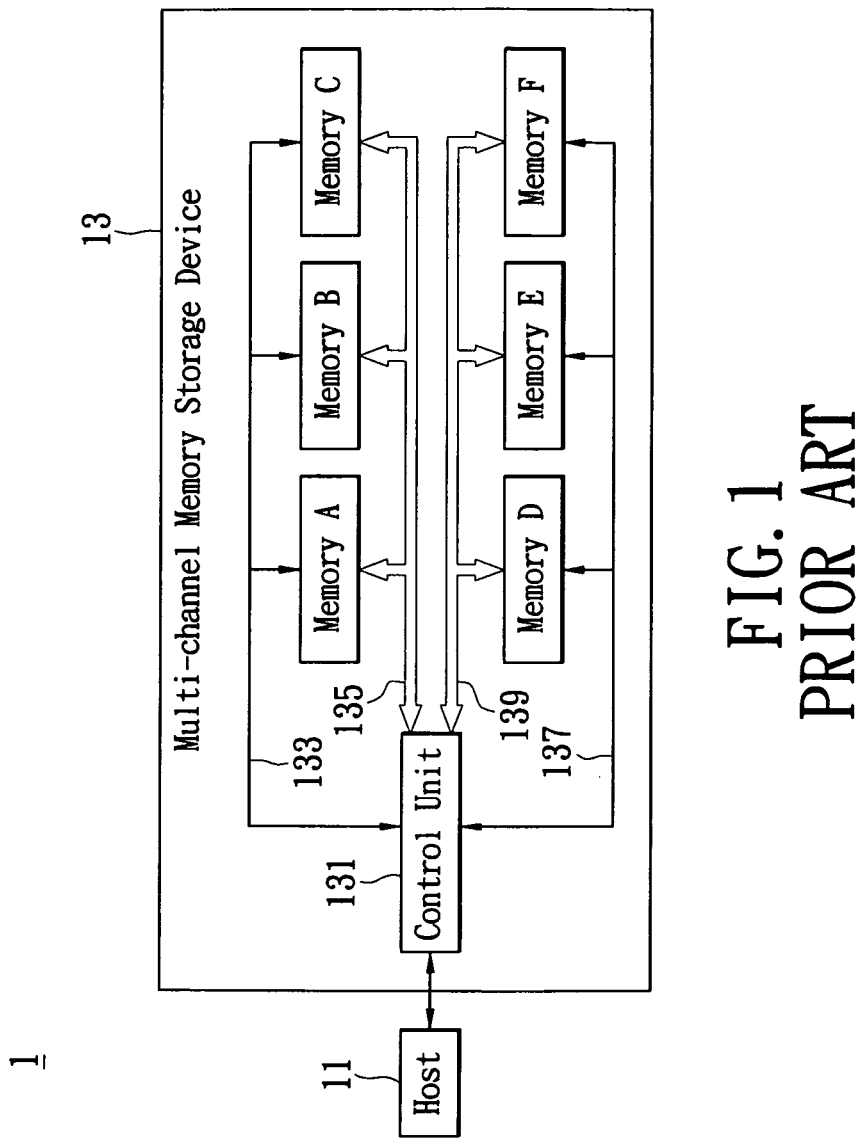
FIG. 1 is a schematic diagram of a prior art multi-channel memory storage device.
Figure 2:
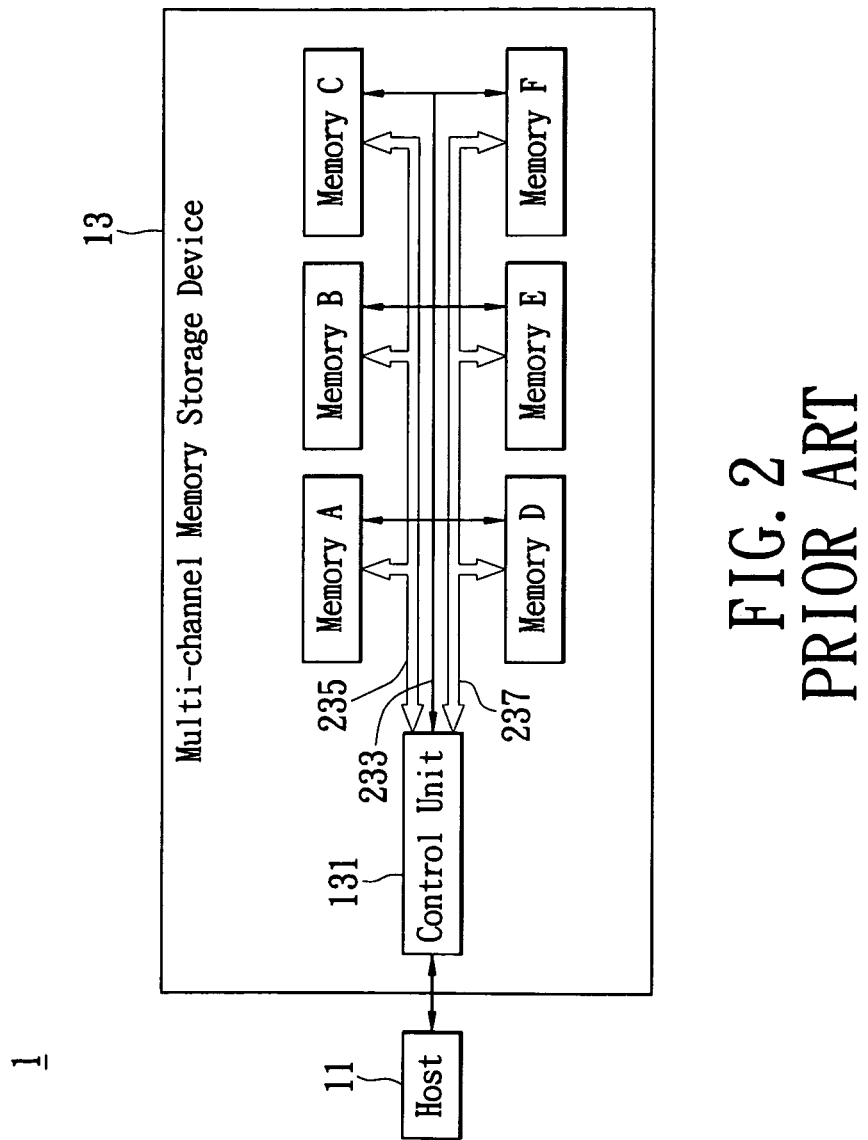
FIG. 2 is another schematic diagram of a prior art multi-channel memory storage device.
Figures 1, 7:
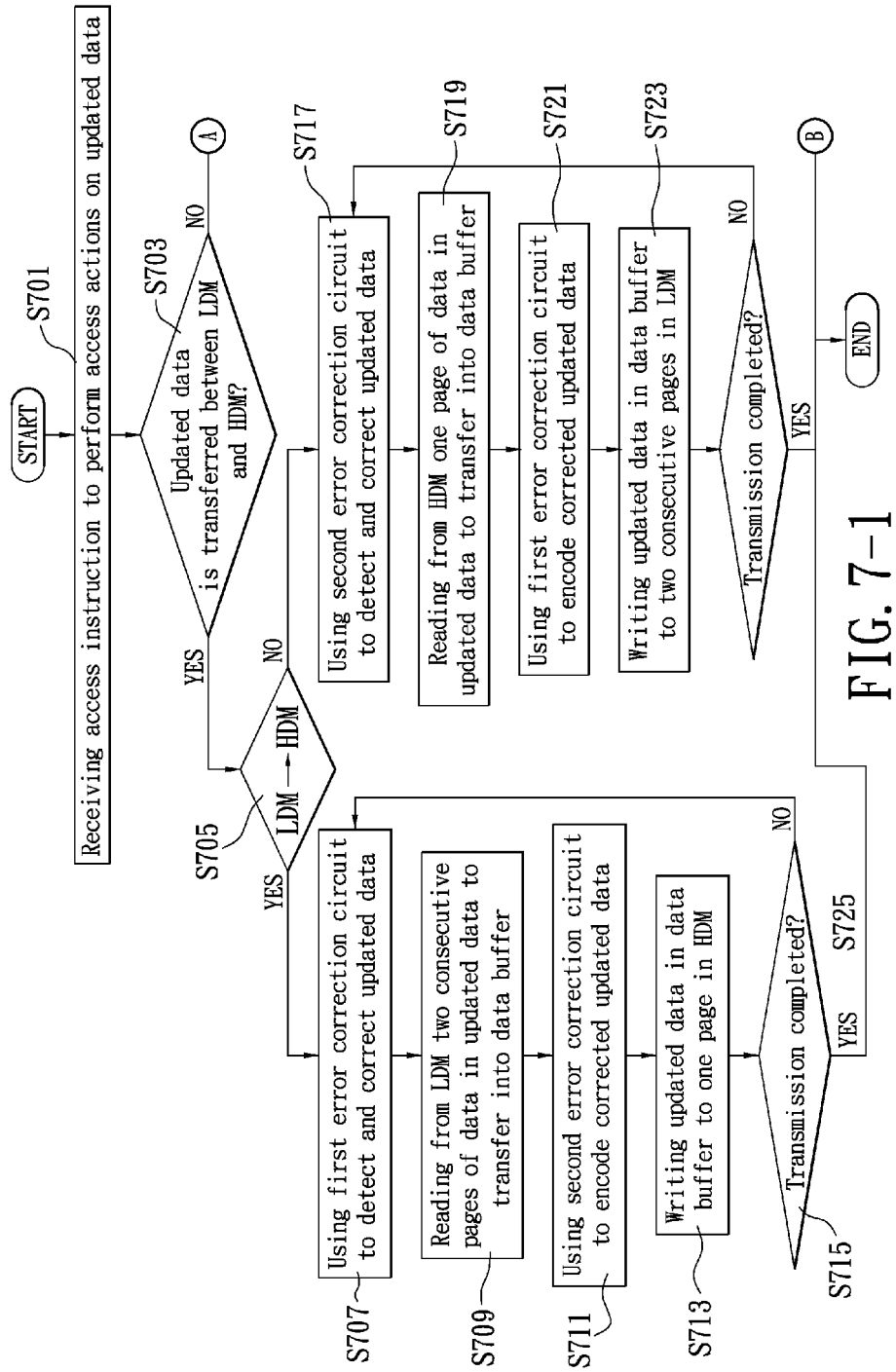

Finally, please refer to FIG. 7-1, 7-2, which are flowcharts of the control method for a multi-channel hybrid density memory storage device disclosed by the present invention. The relevant schematic diagram thereof can be referred in conjunction with FIGS. 3 and 5. As illustrated in FIG. 7-1~7-2, the said control method comprises the following steps:

Initially, the control unit 331 receives an access instruction to perform access actions on an data (step S701); then determines whether such an access instruction requires transfer the data between the memories of the storage device 33 or not (step S703); if yes, then determines whether it needs to move the data from the LDM to the HDM or not (step S705).

In case the determination in step S705 is positive, the control unit 331 uses the first error correction circuit to perform the decoding procedure to detect and correct the error bits of the data within the LDM's 33311 and 33331 (step S707); afterward, simultaneously reads the data in several consecutive pages from the LDM's 33311 and 33331 and then transfers it into the data buffer 3311 (step S709). Taking FIG. 5 for example, it reads the date in 2 consecutive pages, in order conform to the capacity of each page in the HDM 33313; subsequently, the control unit 331 employs the second error correction circuit to encode the decoded data for generating the error correction code (step S711), and writes the encoded data in one page of the HDM 33313 (step S713); finally, determines whether the transmission has been completed or not (step S715); if there exists any data not yet moved to the HDM 33313, then continues executing downward from step S707 until the transmission has been completed.

Suppose the determination in step S705 is negative, which means that the data is intended to be moved from the HDM to the LDM. The control unit 331 uses the second error correction circuit to perform decoding procedure to detect and correct the error bits of the data within the HDM's 33313 and 33333 (step S717) Afterward, it simultaneously reads the data from one pages of the HDM's 33313 and 33333 and then transfers it into the data buffer 3311 (step S719). Subsequently, the control unit 331 employs the first error correction circuit to encode the decoded data for generating the error correction code (step S721), and, after evenly dividing the encoded data, simultaneously writes in two consecutive pages of the LDM's 33311 and 33331 (step S723); finally, determines whether the transmission has been completed or not (step S725); if there exists any data not yet been moved to the LDM 33311 and 33331, then continues executing downward from step S717 until the transmission has been completed.

In case the determination in step S703 is negative, which indicates the current data is transferred between the host 31 and the storage device 33, then determining whether the access instruction is a read instruction or not (step S727); if yes, then determine whether it is to read the data from the LDM 33311 and 33331 (step S729), and in case yes, then the control unit 331 uses the first error correction circuit to perform decoding procedure to detect and correct the error bits of the data (step S731), and simultaneously reads the corrected data from the LDM 33311 and 33331 and then transmits it to the host 31 (step S733); or else (i.e. no for step S729), the control unit 331 uses the second error correction circuit to perform decoding procedure to detect and correct the error bits of the data (step S735), and simultaneously reads the corrected data from the HDM 33313 and 33333 and then transmits the corrected data to the host 31 (step S737).

If the determination made in step S727 is negative, it indicates the access instruction is a write instruction, then determining whether it is to write the data from the host 31 to the LDM's 33311 and 33331 or not (step S739); in case yes, then the control unit 331 uses the first error correction circuit to encode the data for generating the error correction code (step S741), and, after evenly dividing the encoded data, simultaneously writes it into the LDM 33311 and 33331 (step S743); otherwise (i.e. no for step S739), the control unit 331 uses the second error correction circuit to encode the data for generating the error correction code (step S745), and, after evenly dividing the corrected data, simultaneously writes it into the HDM's 33313 and 33333 (step S747).

In one embodiment, the order of steps S707 and S709 may be switched; that is, it may first read the data and register it in the data buffer 3311, and then uses the error correction circuit to perform decoding procedure. Similarly, the order of steps S717 and S719 may be switched as well.

As mentioned above, the architecture of the multi-channel memory storage device described in the embodiments according to the present invention is not limited by the number of memories connected in parallel and the mode of such parallel connection. In addition to the dual-channel architecture composed of one group of LDM's and two groups of HDM's described in the embodiments, it may also be possibly modified as a multi-channel architecture formed by a plurality groups of LDM's and plurality groups of HDM's, which is never restricted by the ones disclosed in the present invention.

Through the above-stated instances, it can be appreciated that the multi-channel hybrid density memory storage device and control method thereof according to the present invention evenly allocates the LDM and HDM in each channel, and through an architecture of connecting in parallel multiple LDM and connecting in parallel multiple HDM, in conjunction with consideration about storage space capacity after conversion of two types of memories with different densities, it performs suitable transmission approaches for the updated data, thereby further increasing data transmission efficiency. In addition to the present invention, depending on the destination of the updated data access, it uses different error correction circuits with different error correction capabilities to encode or decode the updated data, so as to avoid unnecessary resource consumption.

The above-stated illustrations simply set out the detailed descriptions and appended drawings for embodiments of the present invention, which are not meant to limit the present invention thereto. The scope of the present invention should be defined by the following claims, and all changes or modifications that ones skilled in relevant arts can conveniently consider within the field of the present invention are deemed to be encompassed by the scope of the present invention.

What is claimed is:

1. A multi-channel hybrid density memory storage device which is suitable for accessing a user data, the said multi-channel hybrid density memory storage device comprising:
   a non-volatile memory unit, which consists of a plurality of memory groups, wherein each memory group has at least one low density memory (LDM) and at least one high density memory (HDM);
   a plurality of data transmission lines coupled to each memory group, respectively; and
   a control unit, which is coupled to the memory groups by the data transmission lines, used for accessing the user data in the LDM or HDM;
   wherein when the user data is to be transferred from the HDM to the LDM's, the control unit is configured to equally divide the user data before transferring the equally divided user data to the LDM's which are belonging into different memory groups; wherein when the user data is to be transferred from the LDM's to the HDM, the control unit is configured to merge the user data in the LDM's which are belonging into different memory groups before transferring the merged user data to the HDM.

2. The multi-channel hybrid density memory storage device according to claim 1, wherein the user data is transferred between a host and the non-volatile memory unit.

3. The multi-channel hybrid density memory storage device according to claim 1, wherein the user data is transferred between the LDM and the HDM.

4. The multi-channel hybrid density memory storage device according to claim 1, wherein the control unit further comprises:
   a data transmission buffer, which is coupled to the non-volatile memory unit for registering the user data.

5. The multi-channel hybrid density memory storage device according to claim 1, wherein the control unit has a first error correction circuit and a second error correction circuit, and a number of bits the first error correction circuit is capable of correcting is lower than a number of bits the second error correction circuit is capable of correcting.

6. The multi-channel hybrid density memory storage device according to claim 5, wherein the user data in the LDM is decoded and encoded by the first error correction circuit, and the user data in the HDM is decoded and encoded by the second error correction circuit.

7. The multi-channel hybrid density memory storage device according to claim 1, wherein the LDM is a single-level cell (SLC) memory, a phase change memory (PCM), a free ferroelectric random access memory (FeRAM) or a magnetic random access memory (MRAM) and the HDM is a multi-level cell (MLC) memory.

8. A control method of a multi-channel hybrid density memory storage device, which is suitable for accessing a user data, wherein the storage device has a non-volatile memory unit having a plurality of memory groups connected in parallel, each of which has at least one low density memory (LDM) and at least one high density memory (HDM), the control method comprising:

A. providing a first error correction circuit and a second error correction circuit in the storage device, wherein an error correction capability of the first error correction circuit is lower than an error correction capability of the second error correction circuit;
B. determining a transmission direction of the user data;
C. performing an encoding or decoding procedure on the user data by using the first error correction circuit or the second error correction circuit based on the transmission direction of the user data; and
D. when the transmission direction is from the LDM's to the HDM merging the user data in the LDM's which are belonging into different memory groups before the transferring the merged used data to the HDM, and when the transmission direction is from the HDM to the LDM's equally dividing the user data before transferring the equally divided user data to the LDM's which are belonging into different memory groups.

9. The control method according to claim 8, wherein the user data is transferred between the LDM and the HDM.

10. The control method according to claim 9, wherein when the transmission direction of the user data is from the LDM to the HDM, then step C further comprises the following steps:
using the first error correction circuit to decode the user data, so as to detect and correct error bits in the user data; and
using the second error correction circuit to encode the decoded user data.

11. The control method according to claim 10, further comprising the following steps:
reading the user data simultaneously from the multiple LDM; and
merging the encoded user data and writing the encoded user data into the HDM.

12. The control method according to claim 9, wherein when the transmission direction of the user data is from the HDM to the LDM, then step C further comprises the following steps:
using the second error correction circuit to decode the user data, so as to detect and correct error bits in the user data; and
using the first error correction circuit to encode the decoded user data.

13. The control method according to claim 12, further comprising the following steps:
reading the user data from the HDM; and
equally dividing the encoded user data to simultaneously write the encoded equally divided user data into the multiple LDM.

14. The control method according to claim 8, wherein the user data is transferred between a host and the non-volatile memory unit.

15. The control method according to claim 14, wherein when the user data is read from the non-volatile memory unit and then transferred to the host, based on a location of the memory unit from which the user data is read, provides the first error correction circuit or the second error correction circuit to decode the user data.

16. The control method according to claim 14, wherein when the user data is read from the host and then transferred to the non-volatile memory unit, based on a location of the memory unit to which the user data is written, provides the first error correction circuit or the second error correction circuit to encode the user data.

17. The control method according to claim 8, wherein the LDM is a single-level cell (SLC) memory, a phase change memory (PCM), a free ferroelectric random access memory (FeRAM) or a magnetic random access memory (MRAM) and the HDM is a multi-level cell (MLC) memory.

* * * * *